April 13, 1943.    R. G. DYKEMAN    2,316,507
FILLER CAP OR CLOSURE
Filed Oct. 21, 1940

INVENTOR
Rueben G. Dykeman
BY C. B. Stevens
ATTORNEY

Patented Apr. 13, 1943

2,316,507

UNITED STATES PATENT OFFICE 2,316,507

FILLER CAP OR CLOSURE

Reuben G. Dykeman, Dayton, Ohio, assignor to United Aircraft Products, Inc., Dayton, Ohio, a corporation of Ohio Application October 21, 1940, Serial No. 362,056

5 Claims. (Cl. 220—40)

This invention pertains to filler caps and, more particularly, to filler caps or closures for fuel tanks for internal combustion engines.

The fuel tanks of aircraft are ordinarily disposed in aircraft wings, and it is particularly desirable that the filler cap or closure for the in-put neck of the tank lie either slightly below or flush with the outer wing surface in order to avoid air resistance which would be created by a filler cap or closure extending above the wing surface. While the present invention will be described as particularly adapted to use in connection with the fuel tanks of aircraft, it is to be understood that the invention is not limited thereto but is equally applicable to fuel tanks of other devices such as automobiles, water craft, etc.

It is one object of the present invention to provide a filler cap or closure for the fuel tanks of internal combustion engines which will not only be economical to manufacture, but will be of compact form having a minimum number of parts and of minimum weight, and which will also be efficient in use, economical to manufacture, and unlikely to get out of repair.

A further object of the invention is to provide a filler cap or closure which, in filling or closing position will have its top surface flush with the outer surface area of the aircraft part containing the fuel tank.

Another object of the invention is to provide a filler cap or closure of the character described having means optionally positionable to permit grasp of the filler cap or closure by the hand.

Another object of the invention is to provide a filler cap or closure of the character described which will reduce to a minimum the frictional resistance passage of air thereover.

Another object of the invention is to provide a filler cap or closure of the character described which is held in place by tension and which is so constructed and arranged as to reduce to a minimum frictional resistance to operation of the filler cap or closure from closed to open position or vice versa, and which is provided with means for positively locking the cap in its closed position.

With the above primary and other incidental objects in view as will more fully appear in the specification the invention intended to be protected by Letters Patent consists of the features of construction, the parts and combinations thereof and the mode of operation, or their equivalents, as hereinafter described or illustrated in the accompanying drawing.

In the drawing, wherein is shown the preferred but obviously not necessarily the only form of embodiment of the invention:

Like parts are designated from similar characters of reference.

Figure 1:
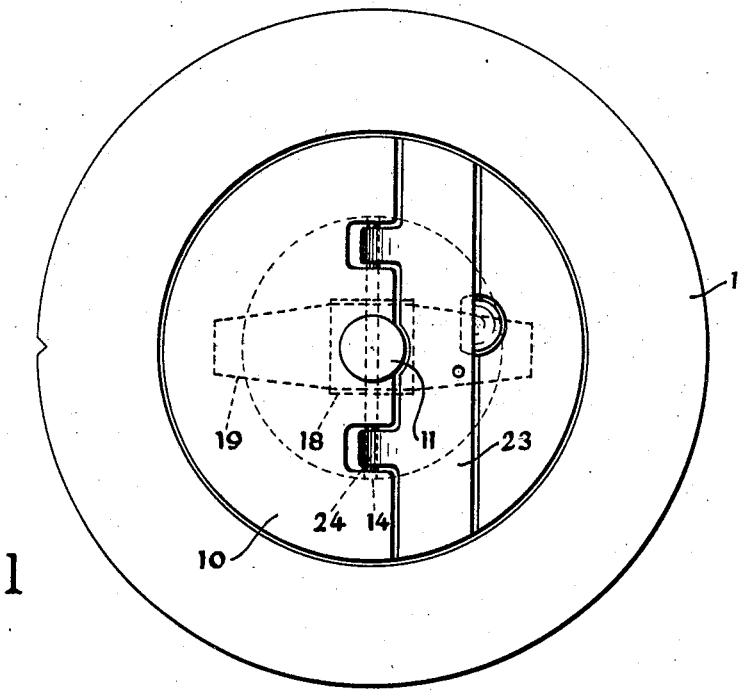
Fig. 1 is top plan view of a filler cap or closure constructed in accordance with the ideas disclosed by this invention.

Referring to the drawing, the filler cap or closure is arranged to be disposed in an annular flanged member 1 adapted to be secured to the upper wall of a fuel tank and having a central opening 2 formed by downwardly turned edges 3. The central portion of the flange member 1 is bent to form an annular U-shaped well 4, for an annular horizontal shoulder 5. The central portion of the flange member 1 is also provided with oppositely disposed slots or openings 6 for a purpose hereinafter described, and the downwardly turned edge 3 is shaped to provide oppositely disposed cam surfaces 7, oppositely disposed dwells 8, and oppositely disposed stop shoulder 9.

The filler cap or closure consists of an annular plate member 10 having a central opening to receive a stud or pin 11. Loosely mounted on this stud or pin 11 is an annular plate member 12 which may be formed by stamping or otherwise and which is bent upwardly, outwardly and downwardly adjacent its circumference to provide an annular pocket for the reception of packing material 13, the plate member 12 being of such size and so arranged that when the cap or closure is in operative position the annular packing 13 will over-lie the rest upon the horizontally extending surface 5 of the flange member 1 and act as a seal to prevent escape of fluid fuel from the fuel tank. The stud or pin 11 is pinned or otherwise secured by a pin 14 to the plate member 10 and carries on its lower end a collar 15 likewise rigidly secured to the stud or pin 11 as by means of a pin 16.

The plate member 12 is loosely mounted on the stud or pin 11 intermediate a shoulder 17 on the stud or pin 11 and the upper surface of the collar 15, the shoulder 17 and the collar 15 limiting movement of the plate member 12 longitudinally of the pin 11, and interposed between the plate member 12 and the collar 15 and secured against rotation against the stud or pin 11 and the collar 15 by means of downturned lateral shoulder 18 is a spring arm 19 adapted to enter the slots 6 in the flanged member 1 and ride over the cam surfaces 7 upon rotation of the plate member 10 and stud or pin 11 to exert downward pressure on the packing material 13 and thereby effectively seal the fuel tank opening. Upon rotation of the plate 10 and the stud or pin 11, the spring arm 19 will be moved into engagement with the oppositely disposed dwells 8 and against the stop shoulder 9 to effectively lock closure in operative position.

Interposed between the top plate 10 and the plate member 12 is a sealing member 20 held in position by a collar 21 which is, in turn, pressed downwardly by a spring 22 to effectively seal the opening in the plate 12 through which the stud or pin 11 extends against leakage of fluid fuel outwardly through the cap or closure at such point in the device. The plate member 10 carries a handle 23 which is pivotally mounted on the pin 12 as at 24 and is thereby movable into vertical grasp position or into horizontal position in a groove 25 in the cap member 10.

It will be noted that the spacing of the shoulder 17 from the top of the stud or pin 11 and the construction and arrangement of the plates 10 and 12 is such that when the cap is in operative position with the spring arm 19 in full engagement with the cam 7 and dwells 8 there will be a space 26 intermediate the upper surface portion of the plate 12 which contains the packing material 13 and the undersurface of the plate 10, and that all pressure exerted through downward pressure of the plate 10 on the plate 12 and spring arm 19 will be exerted only at the central portion of the plate 12 and spring arm 19.

Figure 2:
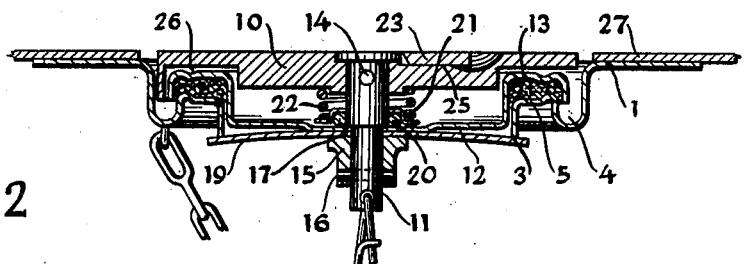
Fig. 2 is a view, partly in section and partly in elevation, of the filler cap or closure shown in Fig 1.
Figure 4:
Fig. 4 is a transverse sectional view of the bayonet arm forming a part of the device.
Figure 3:
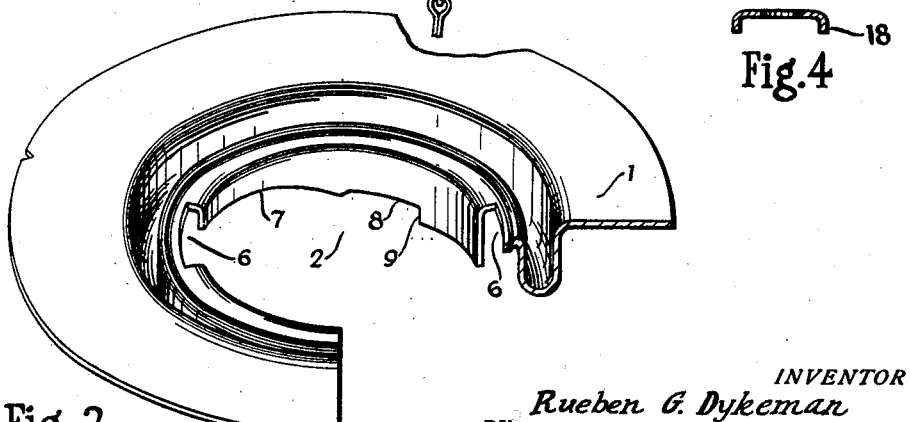
Fig. 3 is a fragmentary perspective view showing the flanged portion which supports and receives the filler cap or closure in operative position.

In the operation of this device, the filler cap 10 is positioned in the opening 2 of the flanged member 1 with the spring arm 19 positioned downwardly through the oppositely disposed slots 6 in the flanged member. Then, the filler cap or closure is rotated by grasping the handle 23 which has been moved to vertical position to move the end of the spring arm 19 into engagement with and along the cam surfaces 7. Due to the confinement of the plate member 12 and the spring arm 19 against movement longitudinally of the stud or pin 11 by means of the shoulder 17 on the stud or pin above the plate 12 and spring arm 19 and the collar 15 on the stud or pin below the plate 12 and spring arm 19, movement of the spring arm 19 against the cam 7 will result in separation of the ends of the spring arm 19 and the outer circumference of the plate 12 due to the packing material carried by the plate 12 resting on the horizontal surface 5 of the flange member 1 to effectively press the packing material into close fitting engagement with the annular horizontally disposed shoulder 5 and effectively seal the opening 2 against leakage therethrough of fluid fuel. By reason of the construction and arrangement of the flange member 1 and filler cap or closure, the filler cap or closure will lie substantially flush with the upper surface of the flanged member 1 when in operative position, and will lie flush with the wing covering which overlies the outer circumference of the flanged member 1 as shown at 27 in Fig. 2.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. In combination with a tank formed with a filler opening, a seat connected to the tank and located below the top thereof and surrounding the opening, a closure for said opening composed of an inner member, a gasket carried by said inner member and engageable with said seat, an outer member having an outer face which lies substantially flush with the top of the tank, a stud having rigid connection with the outer member and supported by the inner member, means fixedly carried by said stud for latching the closure in closed position, said outer member having a cut-out portion, a handle for rotating the outer member received in said cut-out portion and having an outer face which in one position lies substantially flush with the outer face of the outer member, and having ears disposed on opposite sides of the stud, and a pin extending through the stud and pivotally connected at its end portions to the ears of the handle to mount the latter for movements into and out of the cut-out portion.

2. In combination with a tank formed with a filler opening, a seat connected to the tank and located below the top thereof and surrounding the opening, a closure for said opening composed of an inner member, a gasket carried by said inner member and engageable with said seat, an outer member having an outer face which lies substantially flush with the top of the tank, a stud having rigid connection with the outer member and supported by the inner member, means fixedly carried by said stud for latching the closure in closed position, said outer member having a cut-out portion, a handle for rotating the outer member receivable in said cut-out portion and having an outer face which in one position lies substantially flush with the outer face of the outer member, and means fixedly carried by the stud and having pivotal connection with the handle for mounting the latter for movements into and out of the cut-out portion.

3. In combination with a tank having a substantially U-shaped part extending downwardly from its top, and thence extended inwardly and horizontally to form a seat spaced below the top of the tank, and finally downwardly to form a filler opening, a closure for said opening composed of an inner member received therewithin, and disposed below the seat and having an inverted U-shaped pocket which encompasses the seat and is disposed below the top of the tank, a gasket in the pocket engageable with said seat, an outer member having an outer face which lies substantially flush with the top of the tank, means connecting the outer and inner members in spaced relation, said means being rigidly secured to the outer member and supporting the same in spaced relation to the seat and tank, and means secured to said connecting means for latching the closure in closed position.

4. In combination with a tank formed with a filler opening, a seat connected to the tank and located below the top thereof and surrounding the opening, a closure for said opening composed of an inner member, a gasket carried by said inner member and engageable with said seat, an outer member having an outer face which lies substantially flush with the top of the tank, means connecting the outer and inner members in spaced relation, means for rigidly securing the outer member to said connecting means and for supporting the outer member in spaced relation to the seat and tank, a handle, means for pivotally mounting the handle on said securing means, and means carried by said connecting means for latching the closure in closed position.

5. In combination with a tank formed with a filler opening, a seat connected to the tank and located below the top thereof and surrounding the opening, a closure for said opening composed of an inner member, a gasket carried by said inner member and engageable with said seat, an outer member having an outer face which lies substantially flush with the top of the tank, means for supporting the outer member from and in spaced relation to the inner member, and for holding the outer member in spaced relation to the seat and tank, said outer member having a cut-out, a handle for rotating the outer member receivable in the cut-out, means rigidly connecting the outer member to the supporting means and for pivotally mounting the handle for movement into and out of the cut-out, and means carried by said supporting means for latching the closure in closed position.

REUBEN G. DYKEMAN.